United States Patent
Vaidya et al.

(10) Patent No.: US 8,732,714 B2
(45) Date of Patent: May 20, 2014

(54) METHOD FOR REORGANIZING TASKS FOR OPTIMIZATION OF RESOURCES

(75) Inventors: Vinay Govind Vaidya, Pune (IN); Ranadive Priti, Pune (IN); Sah Sudhakar, Pune (IN); Vipradas Jaydeep, Pune (IN)

(73) Assignee: Kpit Technologies Limited, Pune (IN)

( * ) Notice: Subject to any disclaimer, the term of this patent is extended or adjusted under 35 U.S.C. 154(b) by 400 days.

(21) Appl. No.: 13/133,608

(22) PCT Filed: Dec. 3, 2009

(86) PCT No.: PCT/IN2009/000701
§ 371 (c)(1),
(2), (4) Date: Jun. 8, 2011

(87) PCT Pub. No.: WO2010/067377
PCT Pub. Date: Jun. 17, 2010

(65) Prior Publication Data
US 2011/0246998 A1    Oct. 6, 2011

(30) Foreign Application Priority Data
Dec. 8, 2008 (IN) .......................... 2559/MUM/2008

(51) Int. Cl.
*G06F 9/46* (2006.01)
(52) U.S. Cl.
USPC .......................................... 718/103; 718/104
(58) Field of Classification Search
None
See application file for complete search history.

(56) References Cited

U.S. PATENT DOCUMENTS

| | | | | |
|---|---|---|---|---|
| 4,885,686 A | * | 12/1989 | Vanderbei | 700/99 |
| 5,202,987 A | | 4/1993 | Bayer et al. | |
| 5,408,663 A | * | 4/1995 | Miller | 718/104 |
| 5,630,070 A | * | 5/1997 | Dietrich et al. | 705/7.23 |
| 5,838,968 A | * | 11/1998 | Culbert | 718/104 |
| 6,938,256 B2 | * | 8/2005 | Deng et al. | 718/104 |
| 7,178,130 B2 | * | 2/2007 | Chuang et al. | 717/120 |
| 8,073,724 B2 | * | 12/2011 | Harthcryde et al. | 705/7.14 |
| 8,078,487 B2 | * | 12/2011 | Li et al. | 705/7.22 |
| 2002/0091748 A1 | * | 7/2002 | Rehg et al. | 709/107 |
| 2004/0230404 A1 | * | 11/2004 | Messmer et al. | 703/1 |
| 2005/0223046 A1 | | 10/2005 | Smith | |

FOREIGN PATENT DOCUMENTS

EP    533445 A2    3/1993
EP    1416385 A2    5/2004

OTHER PUBLICATIONS

International Search Report dated Aug. 17, 2010 in corresponding International Patent Application No. PCT/IN2009/000701, filed on Dec. 3, 2009—1 page.

* cited by examiner

*Primary Examiner* — Van Nguyen
(74) *Attorney, Agent, or Firm* — Foley & Lardner LLP

(57) ABSTRACT

A method of reorganizing a plurality of task for optimization of resources and execution time in an environment is described. In one embodiment, the method includes mapping of each task to obtain qualitative and quantitative assessment of each functional elements and variables within the time frame for execution of each tasks, representation of data obtained from the mapping in terms of a matrix of dimensions N×N, wherein N represents total number of tasks and reorganizing the tasks in accordance with the represented data in the matrix for the execution, wherein reorganizing the tasks provides for both static and dynamic methodologies. It is advantageous that the present invention determines optimal number of resources required to achieve a practical overall task completion time and can be adaptable to non computer applications.

29 Claims, 3 Drawing Sheets

Case I

Number of processors = 1

Total execution time = 155ms

Case II

Number of Processors=2

Total execution time=95ms

Case III

Number of Processors = 3

Total execution time = 85ms

Case IV

Number of Processors = 4

Total execution time = 80ms

METHOD FOR REORGANIZING TASKS FOR OPTIMIZATION OF RESOURCES

RELATED APPLICATIONS

This application is the U.S. national stage application which claims priority under 35 U.S.C. §371 to International Patent Application No.: PCT/IN2009/000701, filed on Dec. 3, 2009, which claims priority under 35 U.S.C. §119, to Indian Patent Application No.: 255/MUM/2008, filed on Dec. 8, 2008, the disclosures of which are incorporated by reference herein their entireties.

TECHNICAL FILED

The present invention in general relates to task management and more particularly, relates to a method for reorganizing tasks for optimization of resources and execution time in an environment, including at least one processing element.

BACKGROUND ART

Computer programs include a plurality of tasks that are executed in a particular sequence and time determined by logic of the corresponding source code and constraints of the processing hardware used. Computer systems and, in particular, ones incorporating multiple processing elements can achieve faster execution of these computer programs and yet be rational in their demand for processing hardware resources provided they incorporate a method that is efficient in task organization for execution of tasks comprising said computer programs.

Task organization generally refers to logical assignment of priority among tasks or processes in an execution queue. Identification of execution units in input code and organizing execution thereof to achieve faster, yet accurate, execution of said source code are critical parameters deciding the multitasking efficiency and processing capacity of multi/parallel processing systems and especially, real time operating systems. Devising task organizing methods tailor-made for multiple processing environments has been a pressing need of the art.

The part of operating systems which provides the task organizing function is known as the task organizer. Responsibility of a task organizer is to allocate CPU time for execution of tasks/threads/processes in case of single CPU systems. These task organizers generally implement time sharing policies, where CPU time slot is allotted to each process/task/thread for execution. In case of systems with multiple CPUs the task organizer is expected to distribute tasks among different processing elements in such a way that the load is balanced among CPUs and/or execution time is minimized. The challenges faced for writing better task organizing methods are minimizing synchronization and communication times among dependent tasks, optimizing execution time, optimizing resource or CPU utilization, etc.

In this regard, various prior art references have attempted to address said problems through means such as representing a repetitive sequence of execution in the form of a tiled sequence with the aim to reduce data contention and to maximize the locality of data among them; method that identifies parallelizable tasks and organizing them on different processing units; and a method for parallelization and organizing that is based on distributing tasks of different levels obtained by dividing a total processing time by synchronizing time points in a time sequential order. Other few means includes a method that combines pre-run-time and run-time techniques; method comprising a cluster of embedded processors that share a common code distribution bus; and organizing tasks based on resource requirements of the task.

However, there are drawbacks of the methods in the existing prior art such as the overall efficiency of the parallel processing system is not achieved and methods are restricted to either static or dynamic organizing of tasks. Further, methods depend on architectural feedback and fail to determine the optimized organizing of tasks in terms of number of processing elements used. Also, the methods neither provide the optimal number of processing elements required to organize given tasks, nor provides organization of tasks that is optimized in terms of processing element utilization. Furthermore, the methods does not consider data dependency, function call charts, mapping of available processing elements and other related parameters and thus, fails to accurately arrive at optimized organization of execution of tasks.

Information relevant to attempts to address these problems can be found in EP1416385, EP533445, US20070143759, US20070255929, U.S. Pat. No. 5,452,461, U.S. Pat. No. 7,165,252, US20080263555, U.S. Pat. No. 6,292,822, US20070192545, US20070113038 and US20080263555. However, each one of these references suffers from one or more of the above listed drawbacks.

Therefore, the hitherto available methods have not been able to satisfactorily address said problems of the state of the art. Therefore, there exists a need for a method to address the drawbacks by providing a method for enabling static as well as dynamic reorganizing of tasks which serves for optimal use of execution resources and execution time.

SUMMARY OF THE INVENTION

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

It is an object of the present invention to provide for a method of reorganizing tasks to achieve optimization of resources and execution time in an environment. In one aspect, the present invention describes a method of reorganizing a plurality of task for optimization of resources and execution time including the steps of, each task is mapped to obtain qualitative and quantitative assessment of each functional elements and variables within the time frame for execution of each task; data obtained from the mapping is represented in terms of a matrix of dimensions N×N, wherein N represents total number of tasks; and the tasks are reorganized in accordance with the represented data in the matrix for execution, wherein reorganizing the tasks provides for both static and dynamic methodologies.

Accordingly, the present invention provides the method, wherein the environment includes multiple processing elements such as but not limited to multi core elements, symmetric elements and asymmetric elements.

It is another object of the present invention to determine optimal number of resources required for execution of the tasks.

Accordingly, the present invention provides the method to determine minimum time required for execution of tasks assuming unlimited availability of resources, to determine minimum resources required for any given execution time, to determine execution time required if the number of resources is fixed, to determine resource utilization if the number of resources is fixed and to determine resource utilization for given execution time and available resources.

It is advantageous that the present invention determines optimal number of resources required to achieve a practical overall task completion time and can be adaptable to non computer applications.

The systems and apparatuses disclosed herein may be implemented in any means for achieving various aspects. Other features will be apparent from the accompanying drawings and from the detailed description that follows.

BRIEF DESCRIPTION OF DRAWINGS

Embodiments are illustrated by way of example and not limitation in the figures of the accompanying drawings, in which like references indicate similar elements and in which.

Figure 1:
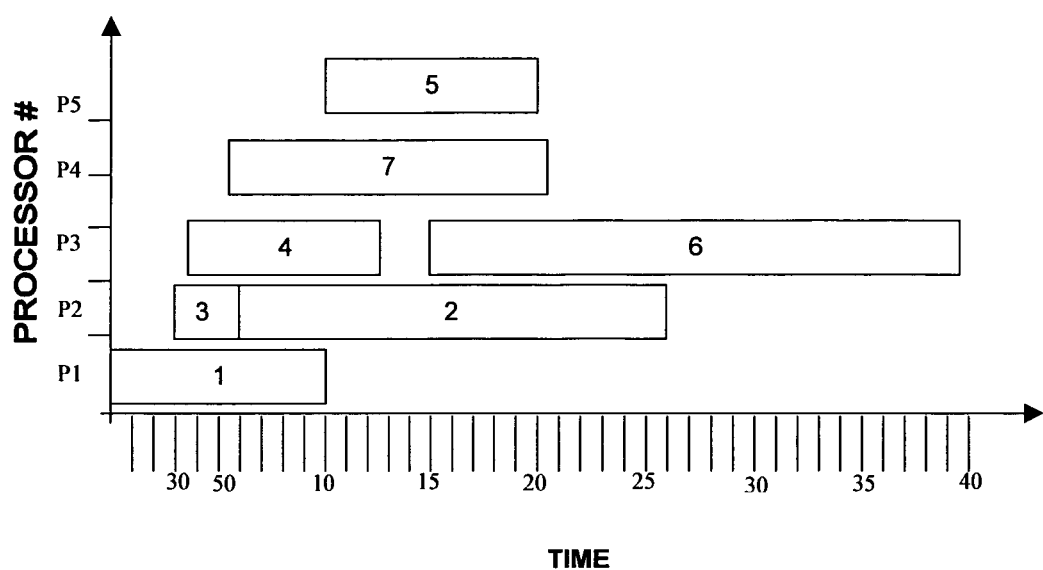
FIG. 1 illustrates graphical representation of reorganization of tasks in an environment comprising multiple processing elements, in accordance with the present invention.

The present invention is capable of multiple embodiments and not in any way restricted in scope and ambit by the within contained description and drawings.

DETAILED DESCRIPTION OF THE INVENTION

The embodiments of the present invention will now be explained with reference to the accompanying drawings. It should be understood however that the disclosed embodiments are merely exemplary of the invention, which may be embodied in various forms. The following description and drawings are not to be construed as limiting the invention and numerous specific details are described to provide a thorough understanding of the present invention, as the basis for the claims and as a basis for teaching one skilled in the art about making and/or using the invention. However in certain instances, well-known or conventional details are not described in order not to unnecessarily obscure the present invention in detail.

The present invention describes a method for reorganizing tasks for optimization of resources and execution time in an environment including at least one processing element. The phrases 'resource element', 'processing element' and 'processor' are used interchangeably through out the document. The task or process or thread can be a computer program code and the 'task reorganizer' or 'reorganizer' reorganizes the execution of the task in accordance with the original execution.

In one exemplary embodiment, a method of reorganizing a plurality of tasks for optimization of resources and execution time in an environment includes the steps of mapping of each task to obtain qualitative and quantitative assessment of each functional elements and variables within the time frame for execution of each task. Thus, the step of mapping reveals characteristics of the subject tasks in accordance to its original execution, including the execution times of individual tasks, sequence of execution, interdependency of the tasks and the schematics of release of downstream tasks as a result of execution of upstream tasks. Further, the data obtained from the mapping is represented in terms of a matrix of dimensions N×N, wherein N represents total number of tasks. Furthermore, the tasks are reorganized for execution in accordance with the represented data in the matrix, wherein reorganizing the tasks provides for both static and dynamic methodologies.

In other words, the method of reorganizing tasks to achieve effective optimization of execution times and execution resources provides for both static as well as dynamic methodologies. The detailed elaboration is hereby sought to be made to each with reference to their function in identifying executable units (tasks) and subsequently, logical assignment of priority to tasks in the execution pipeline.

Dynamic Method of Reorganizing Tasks

In one embodiment, the main memory of a parallel computing system shares the task program with all the resources or processing element in the parallel computing system. The parallel computing system includes a plurality of processing element. Further, the tasks program runs on all the processing elements of a parallel system. The data structure present in the main memory, which is shared by all the processing elements, contains information about tasks that are to be executed. This data structure is shared by all the task reorganizer programs running on different processing elements. In one exemplary embodiment, locks such as common art Mutex can be used for ensuring exclusive access to the shared data structure. It is to be noted that there is no master slave relationship among processing elements or task reorganizers i.e., all processing elements and task reorganizers are at the same level. The working of the task reorganizer in the above mentioned environment is explained as follows.

In one exemplary embodiment, the task reorganizer, which runs on all the processing elements, accesses the shared data structure to check if there is any task ready to run. The highest priority task that is ready to run is chosen for execution. The task reorganizer then changes status of the task or the flag in the data structure of the task being run and mark the flag or status of the task that the task is executing. This is to ensure that another processing element will not pickup the same task for execution. Further, common art locks such as Mutex and Semaphore can be used to ensure exclusive access to this shared data structure. If lock is not available, task program will wait till the lock becomes available for accessing the shared data structure. Once execution of task is over on any of the processing elements, the next task will start running on that processing element.

Further, the task reorganizer checks again whether any task is ready to run by accessing the shared data structure. If no task is ready to run, then the task reorganizer will keep checking periodically until the task becomes ready to run and then start executing it. In another exemplary embodiment, if multiple tasks are ready to run, the task reorganizer will pick-up task with the highest priority. Thus, working of the task reorganizer and mechanism discussed above will continue on all the processing elements of the environment.

Furthermore, as execution of tasks continues, more and more tasks will be ready to run depending on data dependency analysis which would be done before hand. The shared data structure will contain data dependency information which would be calculated by performing program analysis before hand. There could be multiple data dependencies and the data structure will contain the data dependency information. In another exemplary embodiment, the task program code may be inserted in the task after each data dependency is resolved which will modify shared data structure implying that particular data dependency is completed. If all dependencies are resolved then the task becomes ready to run. The context switching can happen at this time as the task reorganizer picks the task with the highest priority for execution. It is possible that task is waiting for I/O or for some resource or for some Mutex. In this case, task will not run and its status will be waiting. Once resource is available then the task will become ready to run. Thus, the status of a task could be ready to run, not ready, waiting, running or complete.

For example: once all data dependencies of the task are resolved and the task becomes ready to run and if no processing elements is available to execute that task then following cases may arise:

Case 1: New task is ready to run and another task is running which have lower priority than the ready-to-run task. In such case, task reorganizer will perform context switching and task having higher priority will start running and task with lower priority will be suspended temporarily. The status of suspended task will be "ready to run" and status of new task will be "running".

Case 2: New task is ready to run and all the tasks that are currently running have higher priority than the new task. In this case, no context switching will happen and the new task will not be executed until processing elements becomes available. Thus, the status of the new task will be 'ready to run'.

Case 3: New task is ready to run and all processing elements are busy. But some task is running which have the same priority as that of the new task. In this case, round robin time slice task reorganizer will be used and both the task will run for specified time. During this time, of some other processor becomes available then both the tasks can run simultaneously on two different processing elements.

In one exemplary implementation, the system mentioned above is applicable for symmetric multi-processor system. However, the system will run on asymmetric multi-core system as well. In asymmetric multi-processor system, there is one primary processing element, mostly RISC architecture where the application execution takes place and there could be one or more co-processing elements which are specialized for performing certain calculations. The RISC processing element uses secondary processors such as DSP co-processor for executing special instructions and for performing special operations such as, multiply and Accumulate (MAC) operations. In case of such asymmetric multi-processor system, task reorganizer will run on main RISC processor only. In this case, it is compiler responsibility to generate task program code so as to use coprocessors.

Static Method for Reorganizing Tasks

In one embodiment, the methodology of assignment of priority to tasks by static method is based on the fact that more the number of tasks dependent on a particular task, then the task reorganizer try to schedule the task on high priority and thus, more tasks will get released due to execution of a particular task. Further, another task, even if ready, may get delayed due to this strategy. Therefore, there are two main criteria for selecting a task for execution or keep that task for waiting, such as task execution time and number of tasks which are dependent on the current task to be executed.

In addition, the static reorganizing method requires the task program code to be executed many times offline to gather all the required information for deciding the reorganizing policy. The relevant information includes the division of task and dependency of tasks in terms of execution time. Further, based on these inputs, task dependency matrix is prepared. Table I shows data of the program code as revealed by separate chronometric mappings and FIG. 1 illustrates graphical representation of reorganization of tasks in an environment comprising multiple processing elements.

In the Table I, task 2 can be started as soon as task 1 has finished with 10 ms execution. Task 3 can be started when task 1 has finished 20 ms and task 2 has finished 10 ms. Here, the 6$^{th}$ row says that the task 6 has duration 20 ms and it can only start after task 2 is executed for 30 ms, task 3 is executed for 20 ms, task 4 is executed for 10 ms and task 5 is executed for 15 ms as shown in FIG. 1. Based on Table I, a task dependency matrix may be formed.

Therefore, form a matrix A such that along the rows we have tasks being executed. Along the columns we have tasks becoming ready for execution. Each element in the i$^{th}$ row is equal to the time of releasing the task j in the jth column. Thus, Tij implies that the i$^{th}$ task will release the j$^{th}$ task after Tij time. Once released, the task j is ready for execution.

DEFINITIONS $T_{AMWT}$—Absolute wait time required for task i to start after task j has started execution (In above case T21=time required for task 2 to start after task 1 has started the execution)
Ti—task number i
$P_i$—Processor number i
T—Task dependency matrix
Tij—element of task dependency matrix, means task i can start its job once task j has finished execution of Tij unit of time
$P_{iwait}$—time required for processor i to finish its job and be ready for next available task
$P_{istat}$—Processor status (Busy or Available)
Txi—Total serial execution time for task i
$Ti_{stat}$—status of task I (executing, finished, not started)
$Ti_{dep}$—Number of tasks dependent on Ti
$N_{proc}$—Number of processor
Tiexec—Time since Ti is executing<Ti In one embodiment, the reorganization of tasks is completely based on the task dependency matrix and is done as described below.

For finding the first task to be executed, task which does not have any dependency is chosen. In Table II, task 1 is the first task. In case there are many tasks which are probable candidate for first task, the priority of execution of tasks is set to decide which of the tasks can be started and which is to be delayed. The three factors to decide the same are: Txi, $N_{proc}$, and $Ti_{dep}$. Thus, the policy considers these three factors for deciding optimal reorganization of tasks. In case, there are more number of processors available, the task with more $Ti_{dep}$ will be given higher priority. Tasks which take more time to execute will not be started earlier than the task which has less Txi. At the same time, number of tasks which gets ready if current task execution is started is deciding factor for deciding the next task to be executed. Therefore, the removal of dependency of other tasks is made sure. Thus, ensuring optimal usage of processors.

In one embodiment, to decide the priority of tasks to be executed, task with $$(\min(Txi \times Tidep)) \text{ is given higher priority} \qquad (1)$$

Once the first task starts execution following values are updated:
Tistat—executing
Pistat—running task i
Piwait—Txi (Means Txi time is remaining for the processor to become free)

Further, for finding next task(s) to be started, either task which were identified in the first step or such selected from tasks remaining using equation (1) are chosen. To select the next task, the task dependency matrix should be scanned to check if there are any tasks which depend on the tasks which are currently executing. Suppose Tj is such a task and it depends on task number i which is currently executing. The logic for deciding the priority of execution shall be as follows:
  a. Find Tij
  b. Check if Tiexec>Tij
  c. check processor availability
  d. If processor is available start execution of task j
  e. In case task x, y, z . . . also satisfy this condition use formula (I) to decide the priority and based on the number of processors available start execution of these task concurrently
  f. The process should be repeated till all the tasks have started and finished execution.

Properties of Task Dependency Matrix:

Absolute minimum wait time for task i, $T_{Ai}$ is between 0 to execution time for task i, $T_{Xi}$. When $T_{Ai}=0$, it means that the $(i+1)^{th}$ task can be started concurrently with task i. On the other hand, if $T_{Ai}=T_{Xi}$ it means that there is no possibility of executing the next task prior to completion of task i.

$$0<=T_{Ai}<=T_{Xi} \qquad \text{Property 1}$$

Total time for serial execution, $T_{max}=T_{X1}+T_{X2}+T_{X3}+T_{X4}+T_{X5}\ldots T_{XM}$     Property 2

Total minimum time required for parallel execution, $T_{min}=\text{Max}(T_{Xi})$     Property 3 where i varies from 1 to M i.e. maximum number of tasks

In the above case $T_{Ai}$ is assumed to be all zero and thus all tasks can be started concurrently.

Last execution will always have $T_{Alast}=T_{Xlast}$

Execution time for task $i=T_{Xi}$     Property 4

When the next task is started on a different processing element, the time remaining for execution on the current processor is $(T_{Xi}-T_{Ai})$. This is the time one would save by parallelizing.

$$(T_{Xi}-T_{Ai})=0 \qquad \text{Case 1}$$

There is no possibility of concurrently running the modules $$(T_{Xi}-T_{Ai})<=T_{A(i+1)} \qquad \text{Case 2}$$

with this $(i+1)^{th}$ task may be started on a new processor. However, $(i+2)^{nd}$ task cannot be started. Thus, there is no point in adding a processor.

---

$(T_{Xi} - T_{Ai}) > T_{A(i+1)}$
In this case one needs to carry out the following:
sum = 0
flag = 0
N = 0 , where N is the number of processing elements
loop (flag!=1)
N = N+1
sum = sum + T $_{A(i+N)}$
loop from j =0 to j<N && flag==0
   if ( sum > (T $_{X(i+j)}$ − T $_{A(i+j)}$) )
      flag=1
   j=j+1
end loop
end loop

---

Number of Processors $K(i)=N$     Case 3

Assuming N is number of processing elements, j is iteration for processing elements, M is number of tasks and i is iteration for tasks, the time remaining for a processor (same processor) to get freed may be different in case of different tasks being considered. Thus, $$T_{R1}=T_{X10}-T_{A10}$$

or $$T_{R1}=T_{X1}-T_{A1}$$

Optimal Number of Processors Vs Optimal Time

In another embodiment, the number of processors required for achieving optimal speed of the execution of task is determined. Further, based on the dead time and wait time of the execution of the tasks, the optimal number of processing elements needed for the execution of any given sequential task program can be determined. The optimal number of processing elements is determined by considering the fact that waiting time and dead time is minimal possible with maximal throughput of all the processing elements.

Figure 2:
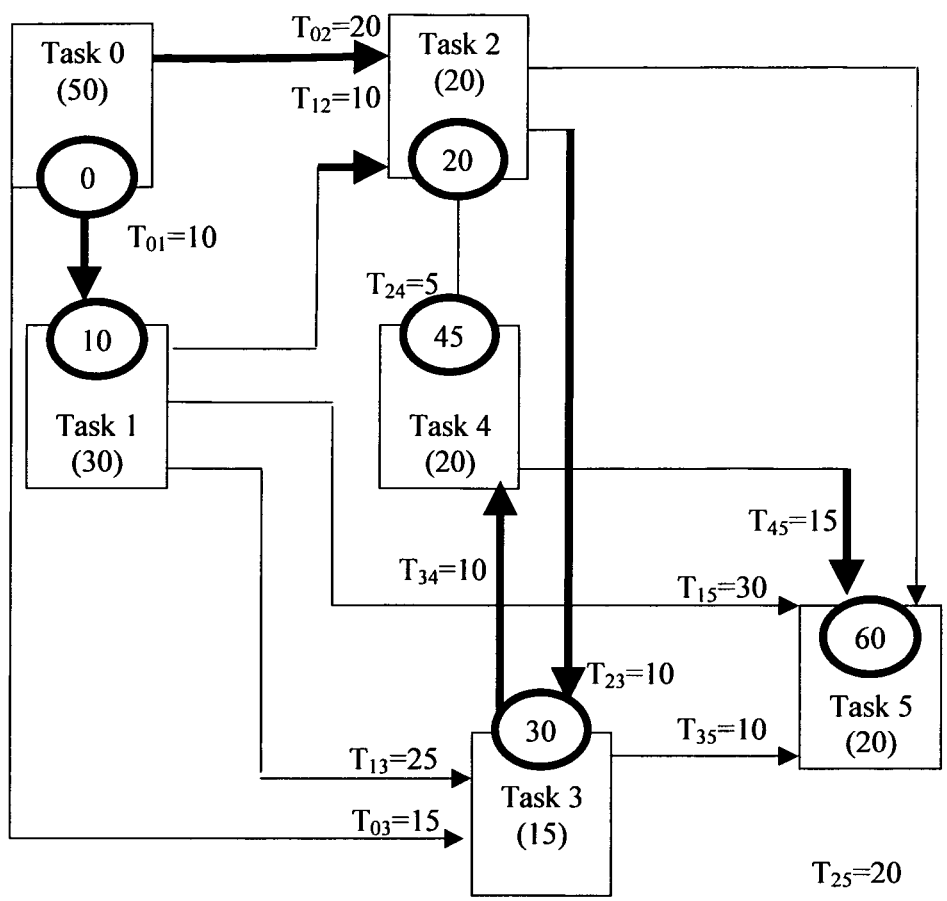
FIG. 2 illustrates a task dependency graph, in accordance with the present invention

Accordingly, in one embodiment, the optimization of the performance in terms of execution time and/or in terms of number of processing elements can be accomplished as follows:

Based on the requirement of the application or the user, the method described tunes to give the desired performance by forming the task dependency matrix
Wherein,
  Tij=indicates the wait time for '$j$'$^{th}$ task to start execution, after 'i'th task has started executing. i.e. the dependency of '$j$'$^{th}$ task on '$i$'$^{th}$ task is over when '$i$'$^{th}$ task runs for time Tij
  Tji=indicates the wait time for task 'j' to start executing after start of '$i$'$^{th}$ task FIG. 2 illustrates a task dependency graph, in accordance with the present invention. Particularly, FIG. 2 indicates the tasks and their respective execution times in enclosed round brackets. For example, task 0 has execution time of 50 ms and task 5 has execution time of 20 ms. The numbers in dark circles indicates the wait time for the respective tasks to start on a new processing element as shown in FIG. 2. The start times are absolute times, with the assumption that task 0 starts on processor 0.

Thus, the absolute wait time for task 3 would not be $T_{13}=25$, just because it is the maximum of the 3 dependencies ($T_{13}$, $T_{03}$ and $T_{23}$), but the execution time is 30 ms, since task 3 depends on task 2 which in-turn depends on task 0. Hence, the wait times for these previous tasks are to be considered. Thus, in this case the maximum time would be the addition of the wait time for task 2 i.e. 20 ms and $T_{23}$ i.e. 10 ms. Further, the execution time vs. number of processor is as depicted in table IV.

FIGS. 3 (a), (b), (c), and (d) show the simulation results of the task reorganization for application with dependency matrix shown in Table III. In is clear from the simulation that $$T_{exec}\alpha(1/N_{proc}) \qquad (2)$$

In yet another embodiment, the optimal number of processors required is determined as described below. In practical cases, it may not be possible to have N number of processors to execute code in parallel. For example, if their exists four processors,
First is master=processor number 0
Second is executing task or function F1=processor number 1
Third is executing task or function F2=processor number 2
Fourth is executing task or function F3=processor number 3
If task F4 is ready for execution and no processors are available, then Dead Time ($T_{dead}$) is calculated Each module will have its own index equal to number of parallelization code index sections in the task program. Further the index is also dependent on the execution time of each task in the neighborhood of the task in the call graph, which includes graphical representation of the sequence in which different tasks are executed in the actual time scale of execution of the sequential computer code.

For example, tasks F1, F2 and F3 takes $\alpha_1$, $\alpha_2$, and $\alpha_3$ time for execution respectively. If we have F4 ready for execution, however processors 1, 2, and 3 are busy executing F1, F2, and F3, the task F4 has to wait for minimum of $\alpha_1$, $\alpha_2$, and $\alpha_3$ for getting processor available to execute F4. This $\alpha_{min}$ becomes the dead time. One of the solutions for the described situation is to find exclusive time of execution for F1, F2, F3, and F4 and find the maximum execution time. Suppose F4 is taking maximum time to execute F1+F2+F3 or any combination of F1/F2/F3 has to execute simultaneously Further, based on dead time and wait time, the method described herein determines the optimal number of processing elements needed for the execution of any given sequential task program. The optimal number depends is determined by considering the fact that waiting time and dead time is minimal possible with maximal throughput of all the processing elements.

Accordingly, to get optimal number of processors required for any application, task dependency matrix is considered by selecting $N_{proc}=1$. The time for execution is noted down for this case. Now $N_{proc}$ is increased by one at a time and $T_{exec(total)}$ is noted down. There will be one instant when adding extra processor would not make effect in total execution time. Number of processors at this instant is called the optimal number of processors ($N_{procopt}$) required for this application.

$$N_{procopt} = (N_{proc} \text{ after which the execution time become constant} = T_{const})$$

Figure 3A:
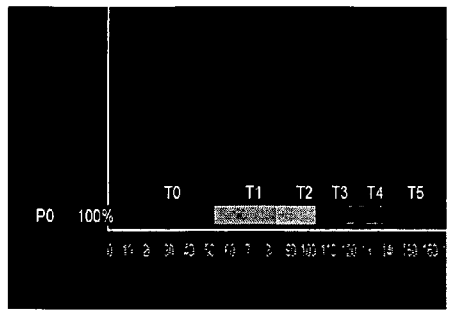
FIGS. 3A, 3B, 3C and 3D illustrate graphical representation of reorganization of tasks in an environment comprising different number of processing elements, in accordance with the present invention.
Figure 3B:
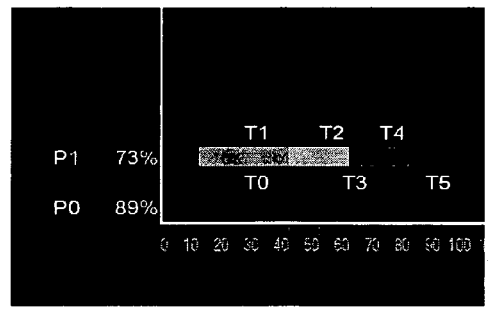
Figure 3C:
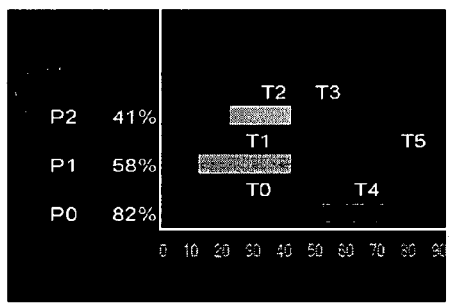
Figure 3D:
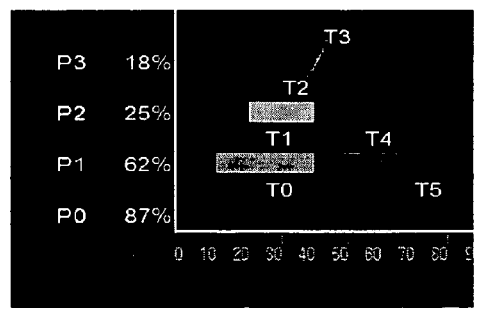

Therefore, the method described determines the number of processing elements required for any application. There are cases when user is satisfied when the execution time ($T_{opt} < T_{const}$). In such cases, the simulation has to stop as soon as $t > T_{opt}$. In this case, the optimal number of processors $N < N_{procopt}$. In above example, suppose the user does not need the speed up beyond 95 ms. Hence, the optimal number of processor for such use would be 2 instead of 5. FIGS. 1, 3(a), (b), (c) and (d) illustrate graphically the reorganization of tasks T0, T1, T2, T3, T4, and T5 along the real time frame. FIG. 1 is illustration of reorganizing of tasks in an environment comprising multiple processing elements while FIG. 3 (a) to FIG. 3(d) illustrate scenarios comprising one additional processing element.

In summary, the optimization of processing elements is determined by inputting tasks to a plurality of processing element for execution; executing the tasks by the processing elements; recording the total execution time of each task; recording engagement time for each processing element; and dividing the engagement time by the execution time to determine utilization of the resources, thus optimizing the resources required. Further, the number of processing elements utilized for achieving minimum execution time is the minimum number of resources required for achieving fastest execution of the tasks.

In one embodiment, the minimum time required for execution and dollar function $(T_{max}-T_{min})*(\text{cost function})$ determine the $s saved if the execution of tasks is parallelized. Therefore, it is to be decided whether it is cost effective to parallelize a given application. Further, the additional cost required for maximum optimization can be determined by the difference of execution time for fixed number of processing elements and infinite number of processing elements.

Task Dependency Analysis and Task Program Code Instrumentation:

In one embodiment, the described method performs data dependency analysis and find out tasks which can be run in parallel. It is to be noted that the task program implies pieces of code that can be run in parallel or ahead of time of their original execution.

Further, the task dependency information and tasks status information are stored in the shared data structure memory. A task may have multiple data dependencies on one or more other tasks. Furthermore, while performing the task program code analysis, the application programming interface (API) call can be inserted in the task program code after each data dependency is resolved. The API will change the shared data structure memory so as to mark that the task dependency is resolved.

In addition, if there are multiple data dependencies then the parallel task will be executed by the task reorganizer only after all the data dependencies, are resolved. This is possible with the help of instrumented code as the API code inserted after each data dependency will keep marking resolution of data dependency in the data structure for each task and for all data dependencies.

For determining the dependencies, chronographic mapping of the individual tasks is necessary. FIG. 2 illustrates flow of data between tasks and their inter-dependencies during execution of the code. Execution times are displayed along with for clarity of time scale.

Data Structure in the Main Storage Memory:

Table V illustrates the various heads under which are the essential elements of the shared data structure which will be accessed by the task reorganizer running on the processing element.

It is to be noted that there will be one such data structure entry for each task. The table V for all the tasks will be generated which would be capable of performing data dependency analysis.

Task ID: Unique number identifying the task

Status: Status of task—Ready, Running, Not ready, Waiting etc

Number of data dependencies: Number of data dependencies to be resolved before starting execution of the task. The API mentioned above (which will be inserted in the task program code) will essentially decrement this number implying that data dependency is resolved. Thus, initially this number represents number of data dependencies of this task. If the field is zero, it represent that all the data dependencies are resolved and the task is ready to run.

Number of tasks that becomes available due to execution of this task: This field tells how many other tasks are dependent on this task. This serves as priority of the task. If more tasks are dependent on this task, then it should be executed first among all available tasks.

Data pointer: Pointer to data which is required for running the task. This may include global variables.

Stack pointer: Pointer to stack which will contain call stack and local variables during execution of this task.

It is to be noted that, these are the essential fields of the shared data structure required by the task reorganizer. There may be more number of fields required in this table as per the actual implantation of the system.

Deciding priority of tasks: In one embodiment, the priority of a task is decided based on the two facts namely, duration of execution of the task and the total number of other tasks dependent on the task.

Initially priority of the task is set by counting number of other tasks that are dependent on the task. Thus, higher priority gets assigned to task on which many other tasks are dependent. Priorities are then readjusted depending on duration as follows:
   a. Sort all the tasks in descending order of duration;
   b. Set a variable count value to total number of tasks;
   c. Add count value to the priority of the first task in the sorted list;
   d. Decrement the count value; and
   e. Continue this adding count to priority and decrementing count operation for all the tasks in the sorted list.

The present invention will now be described in more detail by the way of examples which should not be construed as limiting the invention thereto The following examples, will serve to illustrate the practice of this invention, it being understood that the particulars, shown are by way of example and for purpose of illustrative discussion of embodiments of the invention.

Example 1

Consider a hypothetical computer application containing 7 tasks having data as represented in Table VI.
Where,
Tid is the task ID is the nomenclature used for naming the tasks in the subject application.
Tx is the time required for execution of corresponding task.
NDT is the number of tasks the execution of which can be initiated only after starting the execution of the corresponding task. While assigning priority to a task due consideration will be given to the number of dependent tasks being released by the particular task.
LDT is the list of task IDs which get released during execution of the corresponding task.
Tw is the time required into the execution of the particular releaser task until which execution of the corresponding task cannot be initiated.
Ts is the absolute time, on the real-time scale, at which the task starts its execution. This time is relative to the first resource on which the first task is scheduled.
Te is the total time elapsed, on the real-time scale, at that instance of time. This time is corresponds to the time elapsed for the resource on which the task is scheduled.
SF is the flag for status of the task having following values:
   a. S→task scheduled or execution initiated
   b. NS→task not scheduled yet
   c. C→execution of task is complete

TASK DEPENDENCY RELEASE MATRIX (TDM)= T[N][N]

Where,
T[i][j]=indicates the wait time for 'j'th task to start execution, after 'i'th task has started executing. i.e. the dependency of 'j'th task on 'i'th task is over.
T[j][i]=indicates the wait time for task 'j' to start executing after start of 'i'th task.
Further, having determined the dependency of the tasks, it is an objective of the present invention to achieve logical dispatch of the tasks to individual processing elements to realize the full potential of the multiple processing elements. Mapping of the available multiple processing elements is the next step towards deriving the logic of task reorganization available tasks for processing on said processing environment. Starting with the assumption of having single processor, the same logic leads to the determination of optimal number of processors for fastest practical execution of the subject code. For this, a real time-updated processor status sheet is maintained. Nothing contained within the above contained specification may be construed to be limiting the applicability of the present invention, more particularly illustrated in example 2.

Example 2

Consider pool of engineers which are of same expertise having access to a central shared database which contains information about various tasks to be done. Each task in the database has specific time duration and there are dependencies of a task on other tasks. What an engineer does is that he periodically checks if any task is ready to be executed and starts doing it. In case, multiple tasks are ready, he always picks task with the highest priority and start doing that task. While doing the task, if dependency of some other tasks gets resolved, the engineer modifies the data against that task in the central database. After modification of this dependency data, higher priority task may become ready to start. In such case, the engineer starts the task with the highest priority. Before starting highest priority task, the engineers stores current state of the current task in the central database so that other engineer, if free, can take up that task where it is left. If an engineer finishes a task, it modifies the data in the central database that the task is done and again checks for ready to start task. If no task is ready at that time, he keeps checking periodically for the same until all tasks are complete.

It is advantageous that the tasks are not synonymous to functions and the task is smallest unit program element that may be considered for task reorganizing. The advantages of the present invention are as follows:
   a. Determines optimal number of resources required to achieve a practical overall task completion time.
   b. Adaptable to non computer applications.

The invention is more easily comprehended by reference to the specific embodiment's recited hereinabove which are representative of the invention. It must be understood, however, that the recited embodiments are provided for the purpose of illustration, and that the invention may be practiced otherwise than as specifically illustrated without departing from its spirit and scope. As will be realized, the present invention is capable of various other embodiments and that its several components and related details are capable of various alterations, all without departing from the basic concept of the present invention. Accordingly, descriptions will be regarded as illustrative in nature and not as restrictive in any form whatsoever. Modifications and variations of the system and apparatus described herein will be obvious to those skilled in the art. Such modifications and variations are intended to come within the scope of the appended claims.

Tables

TABLE I

| Task Number | Task Duration (ms) | Dependencies Dependent Number | Time Offset |
|---|---|---|---|
| 1 | 50 | — | — |
| 2 | 30 | 1 | 10 |
| 3 | 20 | 1, 2 | 20, 10 |
| 4 | 15 | 1, 2, 3 | 15, 25, 10 |
| 5 | 20 | 3, 4 | 5.10 |
| 6 | 20 | 2, 3, 4, 5 | 30, 20, 10, 15 |
| 7 | 100 | 1 | 30 |
| 8 | 30 | 2 | 15 |

TABLE II

| Task | Execution Time (TX) | Tij | T1 | T2 | T3 | T4 | T5 | T6 | T7 | T8 |
|---|---|---|---|---|---|---|---|---|---|---|
| 1 | 50 | T1 | 0 | 10 | 20 | 15 | 0 | 0 | 30 | 15 |
| 2 | 30 | T2 | 0 | 0 | 10 | 25 | 0 | 30 | 0 | 0 |
| 3 | 20 | T3 | 0 | 0 | 0 | 10 | 5 | 20 | 0 | 0 |
| 4 | 15 | T4 | 0 | 0 | 0 | 0 | 10 | 10 | 0 | 0 |
| 5 | 20 | T5 | 0 | 0 | 0 | 0 | 0 | 0 | 0 | 0 |
| 6 | 20 | T6 | 0 | 0 | 0 | 0 | 0 | 0 | 0 | 0 |
| 7 | 100 | T7 | 0 | 0 | 0 | 0 | 0 | 0 | 0 | 0 |
| 8 | 30 | T8 | 0 | 0 | 0 | 0 | 0 | 0 | 0 | 0 |

TABLE III

| Task | Execution Time (TX) | Tij | T0 | T1 | T2 | T3 | T4 | T5 |
|---|---|---|---|---|---|---|---|---|
| 1 | 50 | T0 | 0 | 10 | 20 | 15 | 0 | 0 |
| 2 | 30 | T1 | 0 | 0 | 10 | 25 | 0 | 30 |
| 3 | 20 | T2 | 0 | 0 | 0 | 10 | 5 | 20 |
| 4 | 15 | T3 | 0 | 0 | 0 | 0 | 10 | 10 |
| 5 | 20 | T4 | 0 | 0 | 0 | 0 | 0 | 15 |
| 6 | 20 | T5 | 0 | 0 | 0 | 0 | 0 | 0 |

TABLE IV

| Number of Processor | Execution time in ms |
|---|---|
| 1 | 155 |
| 2 | 95 |
| 3 | 85 |
| 4 | 80 |
| 5 | 80 |

TABLE V

| Task ID | Status of Task | Number of data dependencies (Count). Number of dependencies that should be resolved for running this task. | Number of tasks that becomes available due to execution of this task. | Data Pointer. (Pointer to data required for executing this task.) | Stack Pointer |
|---|---|---|---|---|---|

TABLE VI

DATA FOR SUBJECT CODE FOR TIME = 0

| (Tid) | (Tx) | (NDT) | (LDT) | (Tw) | (Ts) | (Te) | (SF) |
|---|---|---|---|---|---|---|---|
| 1 | 100 | 2 | 2, 3 | 60, 30 | 0 | 0 | NS |
| 2 | 200 | 0 | None | 0 | 0 | 0 | NS |
| 3 | 30 | 3 | 4, 6, 7 | 10, 20, 25 | 0 | 0 | NS |
| 4 | 90 | 1 | 5 | 60 | 0 | 0 | NS |
| 5 | 100 | 1 | 6 | 50 | 0 | 0 | NS |
| 6 | 250 | 0 | None | 0 | 0 | 0 | NS |
| 7 | 150 | 0 | None | 0 | 0 | 0 | NS |

We claim:

1. A method of reorganizing a plurality of tasks for optimization of resources in a computing environment, the method comprising:
mapping, using one or more processing elements, each of the plurality of tasks to determine data indicative of dependencies for each task, wherein the data indicative of the dependencies for each respective task of the plurality of tasks comprises an identification of any releasing tasks from which the respective task depends, wherein the respective task must wait until after the releasing task begins execution before the respective task can begin execution, and wherein the data indicative of the dependencies for each respective task further includes, for each releasing task from which the respective task depends, an offset time that must elapse after the releasing task begins execution before the respective task may begin execution;
generating, using the one or more processing elements, a matrix having a row and a column for each of the plurality of tasks and a plurality of matrix data elements, wherein each of the plurality of matrix data elements is associated with a first task of the plurality of tasks and a second task of the plurality of tasks, and wherein each of the plurality of matrix data elements represents the offset time that must elapse after the first task begins execution before the second task may begin execution based on the data indicative of the dependencies; and
reorganizing, using the one or more processing elements, the plurality of tasks in accordance with the plurality of matrix data elements for execution by the one or more processing elements, wherein reorganizing the tasks provides for both static and dynamic methodologies.

2. The method as claimed in claim 1, wherein mapping each of the plurality of tasks further comprises assessing execution time of each task, chronometric data, interdependency of the tasks and a schematic of release of downstream tasks as a result of execution of upstream tasks.

3. The method as claimed in claim 1, wherein the computing environment comprises the one or more processing elements and a common main shared storage memory for recording status values of each of the one or more processing elements as function of task values and execution priority hierarchy.

4. The method as claimed in claim 3, wherein the one or more processing elements comprise at least one of a multi core processor, a symmetric processor, or an asymmetric processor.

5. The method as claimed in claim 3, wherein reorganizing the plurality of tasks comprises dynamically reorganizing the plurality of tasks by executing a task program on all of the one or more processing elements in the computing environment; and storing a status of execution for each of the plurality of tasks in the common main shared storage memory.

6. The method as claimed in claim 5, wherein at least one of a mutex or a semaphore is used to ensure exclusive access to shared data in the common main shared storage memory.

7. The method as claimed in claim 5, wherein reorganizing the plurality of tasks is performed based on a task priority hierarchy.

8. The method as claimed in claim 5, further comprising, for each of the plurality of tasks, setting a flag associated with the task to indicate the status of execution for the task, wherein each of the one or more processing elements is configured to check the flag before selecting the task associated with the flag for execution to prevent tasks from being selected when already being handled by another processing element.

9. The method as claimed in claim 5, wherein a dynamic task reorganizer and the one or more processing elements are at a same hierarchy level within the computing environment and there exists no master slave relationship.

10. The method as claimed in claim 3, wherein the task values comprise one or more of a task ID, a task execution time, a number of dependent tasks, a list of dependent tasks, a wait time for releasing tasks, a start time relative to each processing element, an elapsed time for a corresponding processing element, or a task status flag.

11. The method as claimed in claim 3, wherein the status values of each of the one or more processing elements comprise one or more of a processing element ID, a list of tasks to be executed, a start time for each task on real time scale, a completion time for each task on real time scale, a processing element availability time, a processing element throughput, a processing element turnaround, a processing element waiting time, or a processing element response time.

12. The method as claimed in claim 3, further comprising generating the execution priority hierarchy by:
    sorting all tasks in descending order of execution times to generate a sorted list;
    setting a variable count value to a total number of tasks;
    adding a count value to a priority value for the first task in the sorted list;
    decrementing the count value; and
    repeating addition of the count value to the priority value and decrementing the count value for all tasks in the sorted list for assignment of the execution priority hierarchy.

13. The method as claimed in claim 12, wherein the execution of a dependent task after all of a plurality of task dependencies are resolved is achieved with the help of an application program interface (API) call inserted after each task dependency is resolved.

14. The method as claimed in claim 1, wherein reorganizing the plurality of tasks comprises statically reorganizing the plurality of tasks based on a priority hierarchy of the plurality of tasks, and wherein a position of each of the plurality of tasks within the priority hierarchy is determined based upon an execution time of the task and a number of other tasks dependent on the task.

15. The method as claimed in claim 1, wherein the matrix comprises a square matrix with a number of columns and a number of rows each equaling a number of the plurality of tasks to be executed, and wherein a matrix data element T[i][j] of the plurality of matrix data elements indicates the offset time for a 'j'th task to start execution after an 'i'th task has started executing.

16. The method as claimed in claim 1, further comprising optimizing resources by:
    inputting the plurality of tasks to the plurality of processing elements for execution;
    executing the tasks by the plurality of processing elements;
    recording a total execution time of each task;
    recording an engagement time for each processing element; and
    dividing the engagement time by the execution time to determine utilization of the resources.

17. The method as claimed in claim 1, further comprising determining an optimal number of processing elements for execution of the plurality of tasks by: computing an execution time of each task by unitary incrementing of a number of processing elements until the execution time becomes equal or less than a given execution time; and recording the number of processing elements used.

18. The method as claimed in claim 17, wherein the number of processing elements utilized for achieving a minimum execution time is a minimum number of resources required for achieving a fastest execution of the tasks.

19. The method as claimed in claim 1, further comprising reducing an execution time required to execute the plurality of tasks if a number of the plurality of processing elements is fixed by delaying some of the tasks for processing elements to become free; and selecting a task to be executed based on an execution time for the task and a number of tasks it will release from dependency.

20. The method as claimed in claim 19, further comprising determining a computational cost required for maximum optimization by calculating a difference of the execution time for the plurality of tasks using the fixed number of processing elements and an execution time for the plurality of tasks using an infinite number of processing elements.

21. The method as claimed in claim 1, further comprising improving utilization of the computing resources when a number of the plurality of processing elements is fixed by checking utilization of all of the plurality of processing elements and allocating tasks to the plurality of processing elements based on the checked utilization.

22. The method of claim 1, further comprising determining an order of execution for at least one of the plurality of tasks based in part on a number of dependent tasks that cannot begin execution until after the at least one task begins execution.

23. The method of claim 22, wherein determining an order of execution for at least one of the plurality of tasks based in part on a number of dependent tasks comprises selecting a task of the plurality of tasks that has a greatest number of dependent tasks for a highest position in the order of execution.

24. One or more non-transitory computer-readable storage media having instructions stored thereon that, when executed by one or more processing elements, cause the one or more processing elements to perform operations comprising:
    determining data indicative of dependencies for each task, wherein the data indicative of the dependencies for each respective task of the plurality of tasks comprises an identification of any releasing tasks from which the respective task depends, wherein the respective task must wait until after the releasing task begins execution before the respective task can begin execution, and wherein the data indicative of the dependencies for each respective task further includes, for each releasing task from which the respective task depends, an offset time that must elapse after the releasing task begins execution before the respective task may begin execution;
    generating a matrix having a row and a column for each of the plurality of tasks and a plurality of matrix data elements, wherein each of the plurality of matrix data elements is associated with a first task of the plurality of tasks and a second task of the plurality of tasks, and wherein each of the plurality of matrix data elements represents the offset time that must elapse after the first task begins execution before the second task may begin execution based on the data indicative of the dependencies; and
    determining an order of execution for the plurality of tasks based on the matrix.

25. The one or more non-transitory computer-readable storage media as claimed in claim 24, wherein the operations further comprise determining an order of execution for at least one of the plurality of tasks based in part on a number of dependent tasks that cannot begin execution until after the at least one task begins execution.

26. The one or more non-transitory computer-readable storage media as claimed in claim 25, wherein determining an order of execution for at least one of the plurality of tasks based in part on a number of dependent tasks comprises selecting a task of the plurality of tasks that has a greatest number of dependent tasks for a highest position in the order of execution.

27. A system comprising:
one or more processing elements operably coupled to one or more memory elements and configured to:
  determine data indicative of dependencies for each task, wherein the data indicative of the dependencies for each respective task of the plurality of tasks comprises an identification of any releasing tasks from which the respective task depends, wherein the respective task must wait until after the releasing task begins execution before the respective task can begin execution, and wherein the data indicative of the dependencies for each respective task further includes, for each releasing task from which the respective task depends, an offset time that must elapse after the releasing task begins execution before the respective task may begin execution;
  generate a matrix having a row and a column for each of the plurality of tasks and a plurality of matrix data elements, wherein each of the plurality of matrix data elements is associated with a first task of the plurality of tasks and a second task of the plurality of tasks, and wherein each of the plurality of matrix data elements represents the offset time that must elapse after the first task begins execution before the second task may begin execution based on the data indicative of the dependencies; and
  determine an order of execution for the plurality of tasks based on the matrix.

28. The system as claimed in claim 27, wherein the one or more processing elements are further configured to determine an order of execution for at least one of the plurality of tasks based in part on a number of dependent tasks that cannot begin execution until after the at least one task begins execution.

29. The system as claimed in claim 28, the one or more processing elements are configured to select a task of the plurality of tasks that has a greatest number of dependent tasks for a highest position in the order of execution.

* * * * *